United States Patent [19]

Waldman

[11] Patent Number: 4,967,694
[45] Date of Patent: Nov. 6, 1990

[54] PICTURE AQUARIUM/TERRARIUM FOR A WALL OR TABLE SURFACE

[76] Inventor: Martin S. Waldman, P.O. Box 5473, Vandenberg, Calif. 93437

[21] Appl. No.: 422,987

[22] Filed: Oct. 16, 1989

[51] Int. Cl.$^5$ ............................................. A01K 63/00
[52] U.S. Cl. ............................................. 119/5; 47/69
[58] Field of Search .................... 119/5; 248/310, 300, 248/226.1; 40/160; 47/69

[56] References Cited

U.S. PATENT DOCUMENTS

| | | | |
|---|---|---|---|
| 475,404 | 5/1892 | Lochmann | 119/5 |
| 1,777,944 | 10/1930 | Trovato | 119/5 |
| 1,974,068 | 2/1931 | Greensaft | 119/5 |
| 1,991,683 | 5/1933 | Kelly | 119/5 |
| 2,144,551 | 1/1937 | Skolnick | 119/5 |
| 2,709,494 | 5/1955 | Lucy | 248/310 |
| 3,018,758 | 1/1962 | Arnold | 119/5 |
| 3,119,371 | 1/1964 | Zuckerman | 119/5 |
| 3,121,417 | 2/1964 | Goldman et al. | 119/5 |
| 3,276,428 | 10/1964 | Burch | 119/5 |
| 3,288,110 | 11/1966 | Goldman et al. | 119/5 |
| 3,721,212 | 3/1973 | Groth | 119/5 |
| 3,735,738 | 5/1973 | Lake | 119/5 |
| 3,769,935 | 11/1973 | Johnson | 119/5 |
| 3,874,336 | 4/1975 | Murphy | 119/5 |
| 3,942,669 | 3/1976 | Savage, Jr. | 248/310 |
| 4,136,638 | 1/1979 | Fedor | 119/5 |
| 4,353,327 | 10/1982 | Shroyer | 119/5 |
| 4,576,355 | 3/1986 | Graf | 248/225.1 |

Primary Examiner—Paul J. Hirsch

[57] ABSTRACT

As an improvement to aquaria and terraria, a relatively small, lightweight integrated picture vessel (10): intended for a simple display capability on a vertical or horizontal surface. It is easily assembled out of two components, a open top picture vessel (12) and a picture vessel mounting unit (14). Integrated picture vessel (10) contains a arrangement of combination air/feeding holes (28L,28R), a background scene slot (70), a access opening (42) for removal of a background scene, a vertical mount suspension lip (38), a set of vertical mount spacers (40L,40R), and a horizontal display support member (50). The invention is a mass producible via injection molding, and can be manufactured in a variety of sizes. Typical sizes include postcard and standard photograph dimensions.

18 Claims, 2 Drawing Sheets

PICTURE AQUARIUM/TERRARIUM FOR A WALL OR TABLE SURFACE

BACKGROUND

1. Field of the Invention

This invention relates to aquariums, specifically to a novel manifestation of a picture background aquarium which can be displayed on a vertical or horizontal surface.

This invention also relates to terrariums, specifically to a novel manifestation of a picture background terrarium which can be displayed on a vertical or horizontal surface.

2. Cross Reference to Related Applications

I have on file at the U. S. Patent Office the following Disclosure Document outlining a prototype of this invention: #229900, dated June 23, 1989 titled 'Micro Aquarium/Greenhouse'.

3. Description of Prior Art

Picture/wallmount aquariums are a unique derivation of the very old basic aquarium concept, whereby one can add a special dimension to the versatility and purpose of an aquarium. By integrating the functional requirements of a terrarium into a picture/wallmount aquarium, one arrives at this invention which is a combination picture/wallmount aquarium and terrarium, ideally suited for either an aquarium of terrarium function.

To the best of my knowledge, there is no existing prior art regarding a picture/wallmount terrarium, or a combination picture/wallmount aquarium and terrarium. There are however, a number of patented prior art examples of picture/wallmount aquariums which date back to 1892. Since the first picture/wallmount aquarium in 1892, approximately fourteen inventors have brought related interpretations and derivations of a picture/wallmount aquarium into this world. These picture/wallmount aquariums range from handcrafted and very ornate, to handcrafted and complex, all the way to possibly mass producible, but relatively complex and expensive. These limitations unfortunately restricted the number of people who could benefit from these past inventions. All these picture/wallmount aquariums appear to be relatively difficult and awkward to wallmount, requiring a strong supportive reinforced surface/a number of nails or screws for securing the unit to a wall.

In addition to these disadvantages inherent in all past patented and known prior art inventions of the picture/wallmount aquarium nature, they also suffered from the following disadvantages:

(a) Limitations of their design precluded their practical use on both vertical and horizontal surfaces.

(b) They were not mass producible by inexpensive methods, thus their benefits could not be realized by the mass public.

(c) They were relatively cumbersome to transport, relocate and clean.

(d) It is evident that they could not be displayed on a common wall surface without having a number of attach points, or at least one structural reinforcing support member behind the wall surface for attachment to. These mounting requirements eliminated many possible desired mounting locations, resulting in a decreased versatility of the invention.

(e) In the picture/wallmount aquariums capable of displaying a background scene, changing of these scenes was a relatively complex task.

(f) For the picture/wallmount aquariums capable of displaying a background scene, the availability of appropriate, correctly sized, ready to install background scenery was limited.

(g) They could not be easily sidemounted in combination with side surfaces abutted, thus limiting the possibility of many decorative or scientific uses.

(h) None of the picture/wallmount aquariums were of a sufficient design, or of a construction of adequate materials to normally withstand a matter of course fall, or tip over event. Most accidents of these natures would most likely result in the loss of the aquariums structural integrity, and cause a release of the aquariums contents into the accident area.

All these complexities and shortcomings possibly explain why all the past interpretations of the best contemplated embodiment of a picture/wallmount aquarium were never a success in the marketplace. It is clearly evident that the mass public never has had the opportunity to reap the benefits of a practical, low cost, picture/wallmount aquarium or terrarium.

OBJECTS AND ADVANTAGES

Accordingly, the main objects and advantages of my invention are that it be smartly designed to safely, efficiently and inexpensively perform as either a picture/wallmount aquarium or a picture/wallmount terrarium. It is also of a simple attractive nature which lends itself to state of the art manufacturing methods available with plastic injection molding. It is also simple to wallmount, usually requiring only a brad type nail for support, which can be adequately restrained in a common wall surface with only a couple of hammer taps.

In addition to these clear advantages of my interpretation of what a picture/wallmount aquarium or terrarium should be, this invention also benefits from the following important advantages:

(a) The versatile design of my invention allows for its simple placement on a vertical or horizontal surface.

(b) It is mass producible with inexpensive methods such as injection molding, thus making the invention and its benefits available to the mass public at a very reasonable cost.

(c) It is lightweight and simple to transport even when filled with water. It is easily relocatable to another vertical or horizontal surface, and is simple to clean.

(d) Due to the lightweight nature of my invention, it can normally be supported on practically any suitable stable vertical surface with one small brad type nail, or placed on any suitable stable horizontal surface, with no special structural support required. This versatility allows the invention to be displayed practically anywhere an individual would like to realize its benefits.

(e) The design of my invention incorporates a readily accessible background scene slot which enables the average person to change out a background scene in less than ten seconds, even if the invention is located on a wall.

(f) An inexhaustible supply of quality, ready to install inexpensive background scenes in the form of photographs, postcards, laser prints, drawings and the like are readily available for display in this invention.

(g) The flush side surfaces of my invention allows for simple multiple side abutted installations, for decorative use or scientific study purposes.

(h) The strength of the materials used to manifest my invention, in combination with an interlocking assembly arrangement, protects the structural integrity of my invention, and retains the contents thereof, in the event of a matter of course accidental drop or tip over event.

Further objects and advantages of this invention are to provide a self contained unit which is producible in various sizes, has a simple access for feeding fish, provides adequate ventilation to the contents of the aquarium or terrarium, and is adequately lit by ambient light. These, and all of the above positive factors clearly define an invention which can bring the stress relieving benefits of an aquarium or a terrarium to the mass public, in the form of this combination picture/wallmount aquarium or terrarium. The lightweight nature and compact size of the unit further enhances the options for display, and the benefits thereof. Still further objects and advantages will become apparent from a consideration of the ensuing description and drawings.

DRAWING FIGURES

All drawings shown display the invention constructed of a clear material. It hereby follows that no hidden lines exist in these drawings, with the exception of those necessary in the side views of FIGS. 3 and 4. A description of the drawings follow:

Figure 1:
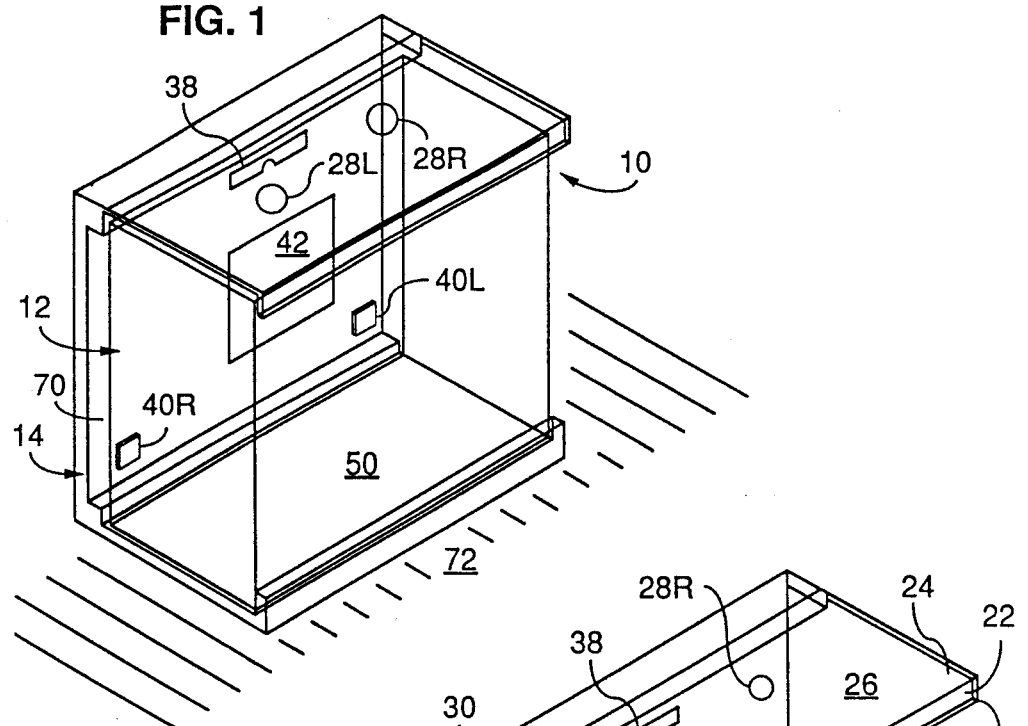
FIG. 1 is a perspective view of the integrated picture vessel displayed on a horizontal surface.

REFERENCE NUMERALS IN DRAWINGS 10 integrated picture vessel
12 open top picture vessel
14 picture vessel mounting unit
16 upper overhang rail
18 vertical interior surface of upper overhang rail
20 horizontal exterior surface of upper overhang rail
22 vertical exterior surface of upper overhang rail
24 integral horizontal exterior surface of upper overhang rail
26 open top picture vessel removable cover
28L air/food hole
28R air/food hole
30 upper rear interior rail
32 vertical surface of upper rear interior rail
34 horizontal surface of upper rear interior rail
36 backplate of picture vessel mounting unit
38 vertical mount suspension lip
40L vertical mount spacer
40R vertical mount spacer
42 background scene access opening
44 lower rear interior rail
46 horizontal surface of lower rear interior rail
48 vertical surface of lower rear interior rail
50 horizontal display support member
52 lower overhang rail
54 integral horizontal exterior surface of lower overhang rail
56 vertical exterior surface of lower overhang rail
58 horizontal exterior surface of lower overhang rail
60
62 vertical interior surface of lower overhang rail
62F open top picture vessel front panel
62B open top picture vessel back panel
64L open top picture vessel left panel
64R open top picture vessel right panel
66 open top picture vessel bottom panel
68 the open top, of the open top picture vessel
70 background scene slot
72 a representative horizontal mounting surface
74 a representative vertical mounting surface
76 head of a brad type nail
78 a brad type nail
80 tank divider
82 tank divider structural reinforcer
84F tank divider front overhang bracket
84B tank divider back overhang bracket
86 fitted decorative accessory base
88 representative background scene

Description -FIGS. 1 to 6

Figures 3, 4, 5:
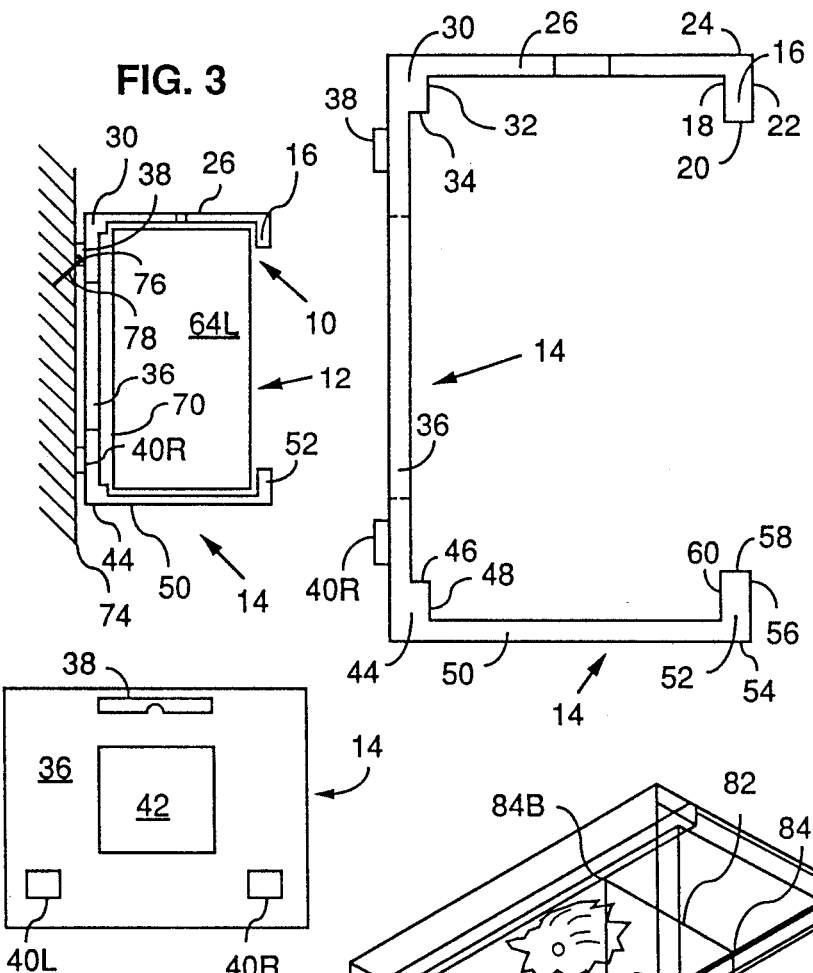
FIG. 3 is a side elevational view of the integrated picture vessel of FIG. 1, displayed on a vertical surface.
FIG. 4 is a enlargement of the picture vessel mounting unit of FIGS. 2 and 3, which clearly defines the rails and their respective surfaces.
FIG. 5 is a rear view of the picture vessel mounting unit, clearly illustrating the configuration and locations of the vertical mount display hardware, and the access opening for removal of a background scene installed in the integrated picture vessel.
Figure 6:
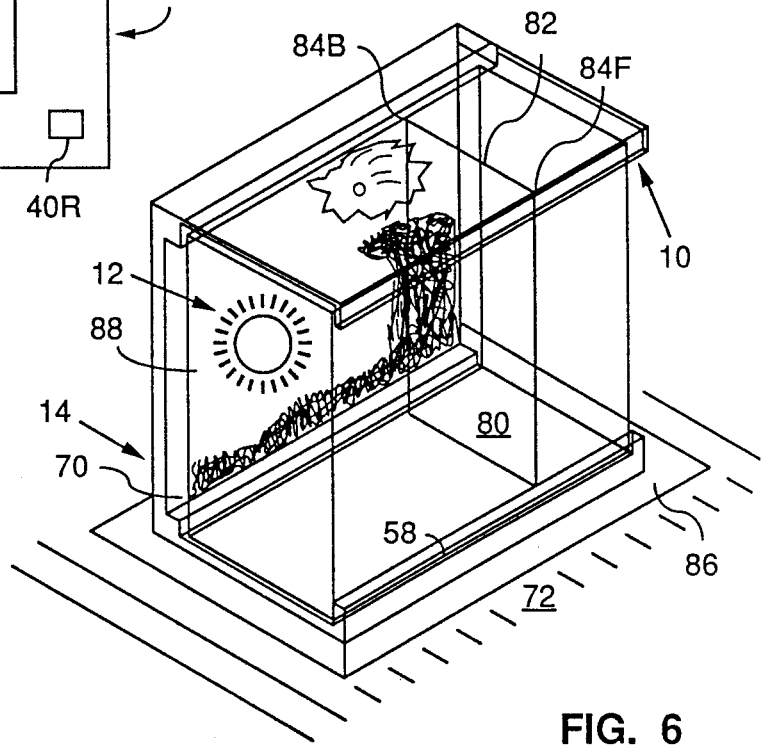
FIG. 6 is a perspective view similar to FIG. 1, which illustrates the versatility of this invention by showing it mounted in a decorative base, with a background scene and tank divider installed.

A integrated picture vessel 10 is illustrated in FIGS. 1, 3 and 6, where integrated picture vessel 10 consists of a open top picture vessel 12 and a picture vessel mounting unit 14. A background scene slot 70 is also plainly visible in FIGS. 1 and 3. In addition, a representative horizontal surface 72 is illustrated in FIGS. 1 and 6, and a representative vertical surface 74 is shown in FIG. 3.

Open top picture vessel 12 of FIGS. 1, 2, 3 and 6 is a one piece, watertight, generally injection molded component of integrated picture vessel 10. It is defined as having interior and exterior surfaces. The interior surfaces are designed to contain a variety of appropriate compatible materials, and the exterior surfaces are designed to securely interface with vessel mounting unit 14. Clarity through the interior and exterior surfaces is required. Open top picture vessel 12 consists of a front panel 62F, a back panel 62B, a left side panel 64L, a right side panel 64R, a bottom panel 66, and a open top 68.

Picture vessel mounting unit 14 illustrated in FIGS. 1-6, is a one piece, generally injection molded component, consisting of interior and exterior surfaces. The interior surfaces are defined as the surfaces which directly interface with open top picture vessel 12, and a representative background scene 88. The exterior surfaces are all other surfaces which interface with the exterior environment.

A complete description of picture vessel mounting hardware 14 as detailed in FIGS. 2, 3, 4 and 5 is as follows: A upper overhang rail 16, is defined by a vertical interior rail surface 18, a horizontal exterior rail surface 20, a vertical exterior rail surface 22, and a integral horizontal exterior rail surface 24. Integral with and perpendicular to rail 16 is a open top picture vessel removable cover 26, which extends from upper overhang rail 16 flush with integral horizontal rail surface 24, to the exterior flush surface of a backplate 36. Removable cover 26 contains a air/food hole 28L and a air/food hole 28R. Situated at the interior upper rear junction of cover 26 and backplate 36 is a integraly placed upper rear rail 30. Upper rear rail 30 consists of a vertical interior rail surface 32, and a horizontal interior rail surface 34.

Figure 2:
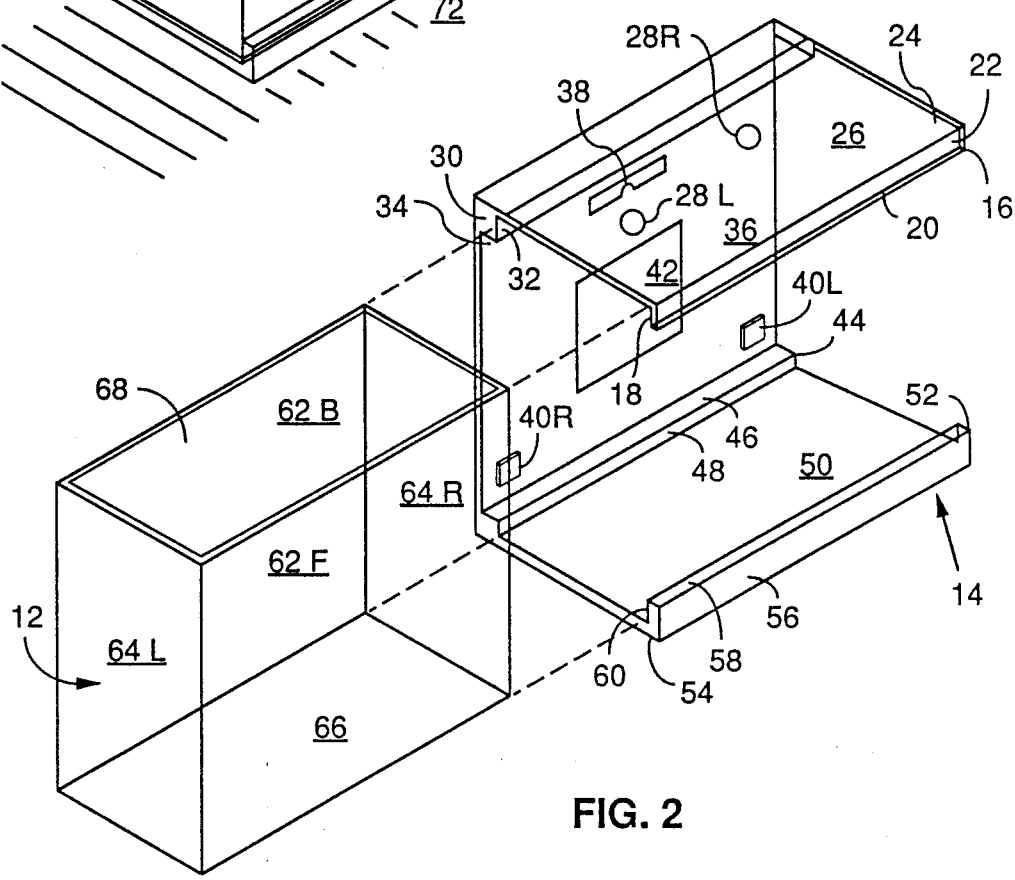
FIG. 2 is a exploded perspective view of the integrated picture vessel illustrating the two major components of the invention and the manner of assembly. On the left is the open top picture vessel, and on the right is the picture vessel mounting unit.

Backplate 36 as further detailed in FIG. 5 is a vertical member, with vertical mount suspension hardware integral to its external surface, consisting of a vertical mount suspension lip 38, a vertical mount spacer 40L and a vertical mount spacer 40R. Vertical mount spacers 40L and 40R are the same thickness as vertical mount suspension lip 38. A background scene access opening 42 is located in backplate 36. Further shown in FIGS. 2, 3 and 4 is a integrally placed lower rear rail 44 situated at the interior lower rear junction of backplate 36 and a horizontal display support member 50. Lower rear rail 44 consists of a horizontal interior rail surface 46, and a vertical interior rail surface 48. Rail 44 has the same dimensions and orientation as upper rear rail 30.

As further illustrated in FIGS. 2, 3 and 4, horizontal display support member 50 extends from the outer flush surface of backplate 36, the same dimensions and orientation as removable cover 26, ending at a lower overhang rail 52, integral and flush with a exterior horizontal rail surface 54. Rail 52 is defined by exterior horizontal rail surface 54, a vertical exterior rail surface 56, a horizontal exterior rail surface 58, and a vertical interior rail surface 60. Rail 52 has the same dimensions and orientation as upper overhang rail 16.

A fitted decorative base 86 is shown in FIG. 6. FIG. 6 also illustrates a tank divider 80, consisting a of structural reinforcer 82, a overhang bracket 84F, a overhang bracket 84B, and representative background scene 88.

From the description above, a number of advantages of this integrated picture bessel become evident:

(a) The simple design of the vertical mount suspension lip, vertical mount spacers, and the horizontal display support member provide for a simple interface with either a vertical or horizontal surface.

(b) The overall simple design of the open top picture vessel and the picture vessel mounting unit allow for their mass production via plastic injection molding. This in turn makes the integrated picture vessel inexpensive and available to the mass public, so they can reap the benefits of its use.

(c) The design, size and sturdiness of the integrated picture vessel allows for its transportation, cleaning and relocation with minimal effort.

(d) The configuration and the choice of materials which define the integrated picture vessel result in a lightweight invention, which can be utilized in practically any suitable environment on practically any table or wall.

(e) The readily accessible background slot between the open top picture vessel and the picture vessel mounting unit provides for a very simple way to install or access a background scene.

(f) The integrated picture vessel is designed for use with the inexhaustible supply of quality, ready to install background scenery available. In particular, postcards, laser prints, photographs and drawings.

(g) The versatile design of the integrated/open top picture vessel allows for its mounting in practically any combination of ways. Multiple smaller open top picture vessels can be contained within a single picture vessel mounting unit, or whole integrated picture vessels can be sidemounted with sides abutted for special display effects or for scientific purposes.

(h) The integrated picture vessel assembly of the open top picture vessel and the picture vessel mounting unit is of an interlocking strong design The advantages of this design are apparent in the event of a matter of course accident with the unit, where the possibility of breakage or loss of contents is greatly minimized.

OPERATION -FIGS. 1, 2, 3, 6

Integrated picture vessel 10 of FIGS. 1, 3 and 6 is assembled from the installation of open top picture vessel 12 into picture vessel mounting unit 14. To assemble as shown in FIG. 2, open top picture vessel 12 is aligned between vertical rail surfaces 18, 32, 48 and 60, of rails 16, 30, 44 and 52 respectively. The exterior of panel 66 of open top picture vessel 12 is then slid along the interior of horizontal display support member 50, until open top picture vessel 12 is aligned within the confines of picture vessel mounting unit 14, with front panel 62F bordered by rail surfaces 20, 22, 56 and 58 as shown in FIGS. 1, 3 and 6. When properly installed, open top picture vessel 12 will be securely held in place by rail surfaces 18, 32, 48 and 60. In this configuration, open top picture vessel 12 can only be removed by pushing it along rail surfaces 18, 32, 48 and 60 with sufficient force to overcome the coefficient of friction between the exterior of panel 66 and the interior of horizontal display support member 50.

Once assembled as shown in FIGS. 1, 3 and 6, slot 70 is defined in the space between the exterior of backpanel 62B and the interior of backplate 36. Slot 70 is for placement of background scene 88 as shown in FIG. 6, having length and height dimensions consistent with the length and height dimensions of integrated picture vessel 10. The width of slot 70 is designed to be roughly two millimeters. In slot 70, background scene 88 consisting of a postcard, photograph, drawing or the like is contained vertically between horizontal rail surfaces 34 and 46, and horizontally between the exterior surface of backpanel 62B in combination with the interior surface of backplate 36. Background scene 88 can be changed as often as desired by simply pushing it out via access opening 42, along rail surfaces 34 and 46 until it can be grasped as it emerges from either end of slot 70.

To display integrated picture vessel 10 on vertical surface 74 as shown in FIG. 3, a brad type nail 78 is tapped into vertical surface 74 until roughly three quarters of a centimeter of nail 78 remains outside vertical surface 74. Integrated picture vessel 10 is then suspended on vertical surface 74, via the interlock of a head 76 of brad type nail 78 into vertical mount suspension lip 38. Spacers 40L and 40R serve to keep the integrated picture vessel 10 stable and parallel to vertical surface 74. To remove integrated picture vessel 10 from vertical surface 74, one grasps picture vessel mounting unit 14 on the outer surface of removable cover 26, and the outer surface of horizontal display support member 50. Integrated picture vessel 10 can then be easily placed on another vertical surface 74 utilizing the same procedure previously defined in this paragraph. It can also be set down on horizontal surface 72 as indicated in FIG. 1, or set level in fitted accessory base 86 as shown in FIG. 6, so horizontal surface 58 is flush with the top of base 86.

Illumination of open top picture vessel 12 interior and background scene 88 installed in slot 70 is possible with only ambient light due to the clear material used to construct open top picture vessel 12, and optionally construct picture vessel mounting hardware 14. Even if picture vessel mounting hardware 14 is constructed of a decorative color material, sufficient ambient light would still enter open top picture vessel 12 via panels 62F, 64L, and 64R to illuminate the interior of open top picture vessel 12, and background scene 88.

An adequate air supply to the contents located in the interior of open top picture vessel 12 is provided via holes 28L and 28R which are located in open top picture vessel removable cover 26 as clearly shown in FIGS. 1, 2 and 6. Holes 28L and 28R provide an adequate air supply into open top picture vessel 12 when it is used as an aquarium, for sustaining the life of air breathing fish such as Bettas. They also provide an adequate space for supplying an external forced supply of air for gill and other type fish or life, if an individual does not wish to make a structural modification to the unit. If integrated picture vessel 10 is used in the terrarium application, holes 28L and 28R provide adequate ventilation for plants requiring a moisture, oxygen and carbon dioxide cycle. Additionally, in the aquarium application of integrated picture vessel 10, holes 28L and 28R also provide a way to feed the fish without removing integrated picture vessel 10 from vertical surface 74 or disassembling open top picture vessel 12 from picture vessel mounting unit 14. Holes 28L and 28R in removable cover 26, are designed and located for equal distribution of food dropped into the water contained in the interior of open top picture vessel 12.

To add, change, or rearrange the contents of integrated picture vessel 10, one simply removes open top picture vessel 12 from picture vessel mounting unit 14 by reversing the procedure previously described, and illustrated in FIG. 2. Once separated, the individual then applies the best personal methods and tools required to accomplish the adding, changing or rearranging task at hand.

FIG. 6 illustrates how tank divider 80 can be placed in the interior of open top picture vessel 12 for segregating fish or other life as required. Tank divider 80 attaches and overhangs open top picture vessel 12 front panel 62F with bracket 84F, and rear panel 62B with bracket 84B. Structural reinforcing member 82 reinforces the top of tank divider 80, which insures that brackets 84F and 84B are of a sufficient strength to adequately support tank divider 80.

SUMMARY, RAMIFICAITONS, AND SCOPE

Accordingly, the reader will see that the integrated picture vessel defined by this invention is the embodiment of virtues which finally serve to make the picture/wallmount aquarium or terrarium a worthwhile, inexpensive purchase for the mass public. The documented scientific studies relating stress reduction with observing fish in an aquarium now takes on an even greater meaning, whereby an individual can easily display their favorite background scene in combination with an aquarium, in practically any location the benefits of this stress relief are desired, such as the workplace. It also follows that for people who find stress relief in maintaining living plants, this invention will be ideal to assist them in finding their happiness, by enabling them to display their favorite background scene in front of their favorite small plants. The limitless supply of postcards and photographs available for use as background scenery illustrates the overwhelming display combinations possible with this invention. Furthermore, the integrated picture vessel has the additional advantages in that:

it permits the stress relieving benefits of a picture/wallmount aquarium or terrarium to be realized in practically any location, and on practically any vertical or horizontal surface.

it provides the mass public with many benefits, which include a low cost, natural source of stress relief as documented by official scientific studies.

it allows the owner to benefit from its portability and maintainability with minimum effort.

it provides many possibilities for use, even if the owner has an environment which restricts his or her options for its use.

it provides a display versatility which can be rearranged practically effortlessly.

it benefits from the vast resources of beautiful photographic scenery readily available to the public at an incredibly low price.

it can be arranged in virtually unlimited combinations of display with other similar units, or existing decorations.

it is safe to use in practically any suitable stable environment

Although the description above contains many specifications, these should not be construed as limiting the scope of the invention, but as merely providing illustrations of some of the presently preferred embodiments of this invention. For example, the integrated picture vessel could be constructed of a open top picture vessel where the picture slot and the vertical mounting hardware are permanently or semi permanently attached to the open top picture vessel, and the open top picture vessel directly rests on a horizontal surface. Thus the scope of the invention should be determined by the appended claims and their legal equivalents.

I claim:

1. As an improvement to aquaria and terraria, a integrated picture vessel capable of housing and maintaining life, that is compatible with a vertical mounting surface and a horizontal mounting surface, comprising:

(a) a open top picture vessel defined as being a combined container and a frame, having a exterior surface area and a interior surface area, a removable cover, and having at least one said exterior surface area which is compatible with said horizontal mounting surface, and which is sufficiently constructed and sized to accommodate a variety of compatible contents including; air, water, hobby fish and other small forms of life, gravel, plants, soil, tank dividers, decorative objects, functional objects and any combination thereof, and being of a shape and clarity through which said variety of contents of said open top picture vessel can be viewed in relationship to a background scene located in a accessible background scene slot adjacent to a surface of said exterior surface area of said open top picture vessel and a corresponding surface area of, (b) a picture vessel mounting means, comprised of a outer surface area and a inner surface area, having at least one said inner surface area which securely interfaces with at least one said exterior surface area of said open top picture vessel, said mounting means being compatible with said exterior surface area of said open top picture vessel, and contains a vertical mount display means and a horizontal mount display means for securing said integrated picture vessel to said mounting surfaces; whereby an individual may display on said mounting surfaces, manifestations of this invention including, a picture aquarium or a picture terrarium, with limitless background scene options available including postcards, photographic prints, laser prints and drawings.

2. The integrated picture vessel of claim 1 wherein said picture vessel mounting means contains a access opening to provide a access means to said background scene installed in said accessible background scene slot, for removal of said background scene from said integrated picture vessel.

3. The integrated picture vessel of claim 2 wherein said removable cover contains a plurality of holes to provide a access means for food and air to enter said interior of said open top picture vessel.

4. The integrated picture vessel of claim 3 wherein said removable cover is formed of a surface which is part of said picture vessel mounting means.

5. The integrated picture vessel of claim 4 wherein said integrated picture vessel is of a general rectangular shape.

6. The integrated picture vessel of claim 4 wherein said integrated picture vessel is of a cubic shape.

7. As an improvement to aquaria a integrated picture vessel capable of housing and maintaining life, that is compatible with a vertical mounting surface and a horizontal mounting surface, comprising:
(a) a open top picture vessel defined as being a combined container and a frame, having a exterior surface area and a interior surface area, a removable cover, and having at least one said exterior surface area which is compatible with said horizontal mounting surface, and which is sufficiently constructed and sized to accommodate a variety of compatible contents including; air, water, hobby fish and other small forms of life, gravel, plants, tank dividers, decorative objects, functional objects and any combination thereof, and being of a shape and clarity through which said variety of contents of said open top picture vessel can be viewed in relationship to a background scene located in a accessible background scene slot adjacent to a surface of said exterior surface area of said open top picture vessel, and a corresponding surface area of,
(b) a picture vessel mounting means, comprised of a outer surface area and a inner surface area, having at least one said inner surface area which securely interfaces with at least one said exterior surface area of said open top picture vessel, said mounting means being compatible with said exterior surface area of said open top picture vessel, and contains a vertical mount display means and a horizontal mount display means for securing said integrated picture vessel to said mounting surfaces whereby; an individual may display on said mounting surfaces, a picture aquarium with limitless background scene options available including postcards, photographic prints, laser prints and drawings.

8. The integrated picture aquarium of claim 7 wherein said picture vessel mounting means contains a access opening to provide a access means to said background scene installed in said background scene slot, for removal of said background scene from said integrated picture aquarium.

9. The integrated picture aquarium of claim 8 wherein said removable cover contains a plurality of holes to provide a access means for food and air to enter said interior of said open top picture vessel.

10. The integrated picture aquarium of claim 9 wherein said removable cover is formed of a surface which is part of said picture vessel mounting means.

11. The integrated picture aquarium of claim 10 wherein said integrated picture aquarium is of a general rectangular shape.

12. The integrated picture aquarium of claim 10 wherein said integrated picture aquarium is of a cubic shape.

13. As an improvement to terraria, a integrated picture vessel capable of housing and maintaining life, that is compatible with a vertical mounting surface and a horizontal mounting surface comprising:
(a) a open top picture vessel defined as being a combined container and a frame, having a exterior surface area and a interior surface area, a removable cover, and having at least one said exterior surface area which is compatible with said horizontal mounting surface, and which is sufficiently constructed and sized to accommodate a variety of compatible items including; air, water, small forms of life, gravel, plants, soil, tank dividers, decorative objects, functional objects and any combination thereof, and being of a shape and clarity through which said variety of contents of said open top picture vessel can be viewed in relationship to a background scene located in a accessible background scene slot adjacent to a surface of said exterior surface area of said open top picture vessel, and a corresponding surface area of,
(b) a picture vessel mounting means, composed of a outer surface area and a inner surface area, having at least one said inner surface area which securely interfaces with at least one said exterior surface area of said open top picture vessel, said mounting means being compatible with said exterior surface area of said open top picture vessel, and contains a vertical mount display means and a horizontal mount display means for securing said integrated picture vessel to said mounting surfaces whereby; an individual may display on said mounting surfaces, a picture terrarium, with limitless background scene options available including postcards, photographic prints, laser prints and drawings.

14. The integrated picture terrarium of claim 13 wherein said picture vessel mounting means contains a access opening to provide a access means to said background scene installed in said background scene slot, for removal of said background scene from said integrated picture terrarium.

15. The integrated picture terrarium of claim 14 wherein said removable cover contains a plurality of holes to provide a access means for food and air to enter said interior of said open top picture vessel.

16. The integrated picture terrarium of claim 15 wherein said removable cover is formed of a surface which is part of said vessel mounting means.

17. The integrated picture terrarium of claim 16 wherein said integrated picture terrarium is of a general rectangular shape.

18. The integrated picture terrarium of claim 16 wherein said integrated picture terrarium is of a cubic shape.

* * * * *